(12) United States Patent
Hattori et al.

(10) Patent No.: US 8,279,956 B2
(45) Date of Patent: Oct. 2, 2012

(54) INFORMATION PROCESSING APPARATUS, INFORMATION PROCESSING METHOD, DISPLAY APPARATUS AND INFORMATION PROCESSING PROGRAM

(75) Inventors: Masayuki Hattori, Kanagawa (JP);
Takashi Yokokawa, Kanagawa (JP);
Hidetoshi Kawauchi, Kanagawa (JP);
Hiroyuki Kamata, Kanagawa (JP);
Ryoji Ikegaya, Tokyo (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 12/568,783

(22) Filed: Sep. 29, 2009

(65) Prior Publication Data

US 2010/0080316 A1  Apr. 1, 2010

(30) Foreign Application Priority Data

Sep. 30, 2008 (JP) ................................ P2008-253296

(51) Int. Cl.
*H04K 1/10* (2006.01)
(52) U.S. Cl. ........ 375/260; 375/267; 375/340; 375/344; 375/350; 370/252; 370/210
(58) Field of Classification Search ............... 375/260
See application file for complete search history.

(56) References Cited

FOREIGN PATENT DOCUMENTS

| | | |
|---|---|---|
| EP | 1 441 484 | 7/2004 |
| JP | 10 112736 | 4/1998 |
| JP | 2001-345775 | 12/2001 |
| JP | 2002-9731 | 1/2002 |
| JP | 2004-32030 | 1/2004 |
| JP | 2004-228853 | 8/2004 |
| JP | 2004-266814 | 9/2004 |
| JP | 2004-336279 | 11/2004 |
| JP | 2005 252671 | 9/2005 |
| JP | 2006-270831 | 10/2006 |
| JP | 2007 318479 | 12/2007 |
| JP | 2010 81514 | 4/2010 |
| JP | 2010 87750 | 4/2010 |
| WO | WO 2005 109712 | 11/2005 |

*Primary Examiner* — Lihong Yu
(74) *Attorney, Agent, or Firm* — Frommer Lawrence & Haug LLP; William S. Frommer; Thomas F. Presson

(57) ABSTRACT

Disclosed herein is an information processing apparatus including: a demodulation FFT processing section configured to carry out an FFT process on a demodulation-related signal extracted by making use of a demodulation FFT window from every symbol of a received OFDM signal and output the frequency-domain signal; a control FFT processing section configured to carry out a process equivalent to an FFT process on a control-related signal extracted by making use of a control FFT window from every symbol of the received OFDM signal and output the frequency-domain signal; a transmission-line information estimation section; an equalization section; a reception-quality computation/comparison section; and an FFT-window position control section configured to control the demodulation FFT window to be used by the demodulation FFT processing section and the control FFT window to be used by the control FFT processing section on the basis of a comparison result produced by the reception-quality computation/comparison section.

11 Claims, 8 Drawing Sheets

INFORMATION PROCESSING APPARATUS, INFORMATION PROCESSING METHOD, DISPLAY APPARATUS AND INFORMATION PROCESSING PROGRAM

BACKGROUND OF THE INVENTION

1. Field of the Invention

The present invention relates to an information processing apparatus, an information processing method, a display apparatus and an information processing program. To be more specific, the present invention relates to an information processing apparatus functioning as an OFDM (Orthogonal Frequency Division Multiplexing) receiving apparatus capable of receiving an OFDM signal without increasing the scale of the circuit and without deteriorating the reception quality of demodulation data, relates to an information processing method adopted by the information processing apparatus, relates to a display apparatus for displaying an image based on data generated by the information processing apparatus and relates to an information processing program implementing the information processing method.

2. Description of the Related Art

An OFDM modulation method is adopted in not only ground wave digital broadcasting in Japan, but also a wide range of fields other than the ground wave digital broadcasting. For details of applications of the OFDM modulation method, the reader is suggested to refer to Japanese Patent Laid-open Nos. 2001-345775, 2002-9731, 2004-228853, 2004-336279, 2004-266814, 2004-32030 and 2006-270831 (hereinafter referred to as Patent Documents 1 to 7, respectively).

In accordance with the OFDM modulation method, an OFDM signal is transmitted in OFDM symbol units. In order to provide each of the OFDM symbols with a property of tolerance for multipath transmissions, a rear part of a valid OFDM symbol is attached to a front part of the valid OFDM symbol to serve as a guard interval.

In processing of demodulating a received OFDM signal, a signal detected through an FFT window of a valid OFDM symbol interval is subjected to an FFT (Fast Fourier Transform) process in order to separate the detected signal into those of a plurality of carrier components. In such demodulation processing, if a signal detected through an FFT window of a valid OFDM symbol interval is composed of only signals of the same OFDM symbol including the guard interval thereof, the orthogonality is sustained.

SUMMARY OF THE INVENTION

If signals detected through an FFT window of a valid OFDM symbol interval include a signal of preceding and succeeding OFDM symbols, however, there are interferences between the symbols so that the orthogonality is lost and a reception characteristic thus undesirably deteriorates.

Therefore, in order to sustain a good reception characteristic, it is necessary to set the FFT window with a high degree of accuracy. In accordance with a conceivable technique for setting the FFT window with a high degree of accuracy, the FFT window is properly changed and the reception quality is then evaluated from a signal obtained as a result of execution of the FFT process based on the FFT window. Subsequently, the FFT-window position providing an optimum reception quality is found by updating the position of the FFT window from time to time. In the following description, this technique for setting the FFT window is referred to as an FFT-window setting technique.

There are two FFT-window setting techniques in related art. In the following description, the two FFT-window setting techniques in related art are referred to as a first FFT-window setting technique in related art and a second FFT-window setting technique in related art respectively.

In accordance with the first FFT-window setting technique in related art, for every OFDM symbol, the FFT process for a signal extracted by making use of one FFT window is carried out and the position of the FFT window is updated in accordance with the reception quality which has been obtained as a result of the execution of the FFT process based on the FFT window.

On the other hand, the second FFT-window setting technique in related art is a technique which has a plurality of FFT circuits. The second FFT-window setting technique in related art is explained as follows. In accordance with the second FFT-window setting technique in related art, an FFT-window position providing a best reception quality is set as the position of the next demodulation FFT window. The best reception quality is the best among reception qualities which have been obtained as results of the execution of FFT processes at an FFT-window position used in the current demodulation process and other FFT-window positions.

In accordance with the first FFT-window setting technique in related art, however, the results of the FFT process carried out at a varying FFT-window position in order to improve the reception quality are used for evaluating the reception quality and also used as final demodulated data which is defined as data ready to be displayed. Thus, in accordance with the way to vary the position of the FFT window, the reception quality may adversely be worsened in some cases.

In the case of the second FFT-window setting technique in related art, on the other hand, an FFT circuit exists for every FFT window. Thus, even if the reception quality obtained from the result of an FFT process carried out in an FFT window other than the FFT window for the demodulation process deteriorates, demodulation data is not affected. However, the problem of the circuit scale increase caused by a plurality of FFT circuits each having a large circuit scale cannot be ignored.

As described above, the first FFT-window setting technique in related art raises a problem that the reception quality of the demodulation data deteriorates. On the other hand, the second FFT-window setting technique in related art raises a problem that the circuit scale increases. That is to say, at the present day, there is a demand for an OFDM receiving apparatus for receiving an OFDM signal without deteriorating the reception quality of the demodulation data and without increasing the circuit scale. Nevertheless, in the present state of the art, the demand has not been met sufficiently.

Addressing the problems described above, inventors of the present invention have innovated an OFDM receiving apparatus capable of receiving an OFDM signal without increasing the scale of the circuit and without deteriorating the reception quality of demodulation data.

In accordance with a first embodiment of the present invention, there is provided an information processing apparatus employing:

demodulation FFT processing means for carrying out an FFT (Fast Fourier Transform) process on a demodulation-related signal extracted by making use of a demodulation FFT window from every symbol of a received OFDM (Orthogonal Frequency Division Multiplexing) signal in order to convert the extracted signal from a time-domain signal into a frequency-domain signal and for outputting the frequency-domain signal;

control FFT processing means for carrying out a process equivalent to an FFT process on a control-related signal extracted by making use of a control FFT window from every symbol of the received OFDM signal in order to convert the extracted signal from a time-domain signal into a frequency-domain signal and for outputting the frequency-domain signal;

transmission-line information estimation means for generating a transmission-line information estimation value by making use of an SP (Scattered Pilot) signal selected from the frequency-domain output by the demodulation FFT processing means;

equalization means for equalizing the frequency-domain signal output by the demodulation FFT processing means and the frequency-domain signal output by the control FFT processing means by making use of the transmission-line information estimation value generated by the transmission-line information estimation means;

reception-quality computation/comparison means for computing a demodulation reception quality by making use of all or a part of the frequency-domain signal generated by the demodulation FFT processing means and equalized by the equalization means and computing a control reception quality by making use of all or a part of the frequency-domain signal generated by the control FFT processing means and equalized by the equalization means and for comparing the computed demodulation reception quality with the computed control reception quality; and FFT-window position control means for controlling a demodulation FFT window to be used by the demodulation FFT processing means and a control FFT window to be used by the control FFT processing means on the basis of a comparison result produced by the reception-quality computation/comparison means.

An information processing method according to another embodiment of the present invention is an information processing method adopted by the information processing apparatus described above whereas an information processing program according to a further embodiment of the present invention is a program implementing the information processing method. A display apparatus according to a still further embodiment of the present invention employs display means for displaying a video represented by a final demodulated signal originated from the frequency-domain signal generated by the demodulation FFT processing means and equalized by the equalization means. The display means is one of configuration means employed in the information processing apparatus.

In the information processing apparatus according to the embodiment of the present invention, the information processing method according to the other embodiment of the present invention and the information processing program according to the further embodiment of the present invention, the information processing apparatus serving as an OFDM receiving apparatus receives an OFDM signal.

Then, an FFT process is carried out on a demodulation-related signal extracted by making use of a demodulation FFT window from every symbol of the received OFDM signal in order to convert the extracted signal from a time-domain signal into a frequency-domain signal serving as an output of the FFT process. In the following description, the frequency-domain signal is referred to as a demodulated signal representing the demodulation data mentioned before.

By the same token, an FFT process is carried out on a control-related signal extracted by making use of a control FFT window from every symbol of the received OFDM signal in order to convert the extracted signal from a time-domain signal into a frequency-domain signal serving as an output of the FFT process. In the following description, the frequency-domain signal is referred to as a control signal representing control data.

Then, a transmission-line information estimation value is generated by making use of an SP (Scattered Pilot) signal selected from the demodulated signal output by the demodulation FFT processing means.

Subsequently, an equalization process is carried out by the equalization means on the demodulated signal and the control signal by making use of the transmission-line information estimation value.

Then, the reception quality of all or a part of the equalized demodulated signal and the reception quality of all or a part of the equalized control signal are computed and the computed reception qualities are compared with each other.

Subsequently, a demodulation FFT window to be used by the demodulation FFT processing means and a control FFT window to be used by the control FFT processing means are controlled on the basis of a result of the comparison.

In addition, the display apparatus according to a still further embodiment of the present invention displays a video represented by the equalized demodulated signal which is also referred to as the final demodulated signal mentioned previously. As is obvious from the above description, the equalized demodulated signal is the frequency-domain signal generated by the demodulation FFT processing means and then equalized by the equalization means.

As described above, in accordance with the present invention, an FFT effect given by a plurality of FFT windows can be obtained without making use of a plurality of FFT circuits which each have a large scale. In addition, since the control FFT process carried out by making use of a control FFT window does not have an effect on the demodulation data, the reception characteristic does not deteriorate.

BRIEF DESCRIPTION OF THE DRAWINGS

These and other innovations as well as features of the present invention will become clear from the following description of a preferred embodiment given with reference to the accompanying drawings, in which.

DETAILED DESCRIPTION OF THE PREFERRED EMBODIMENTS

Figure 1:
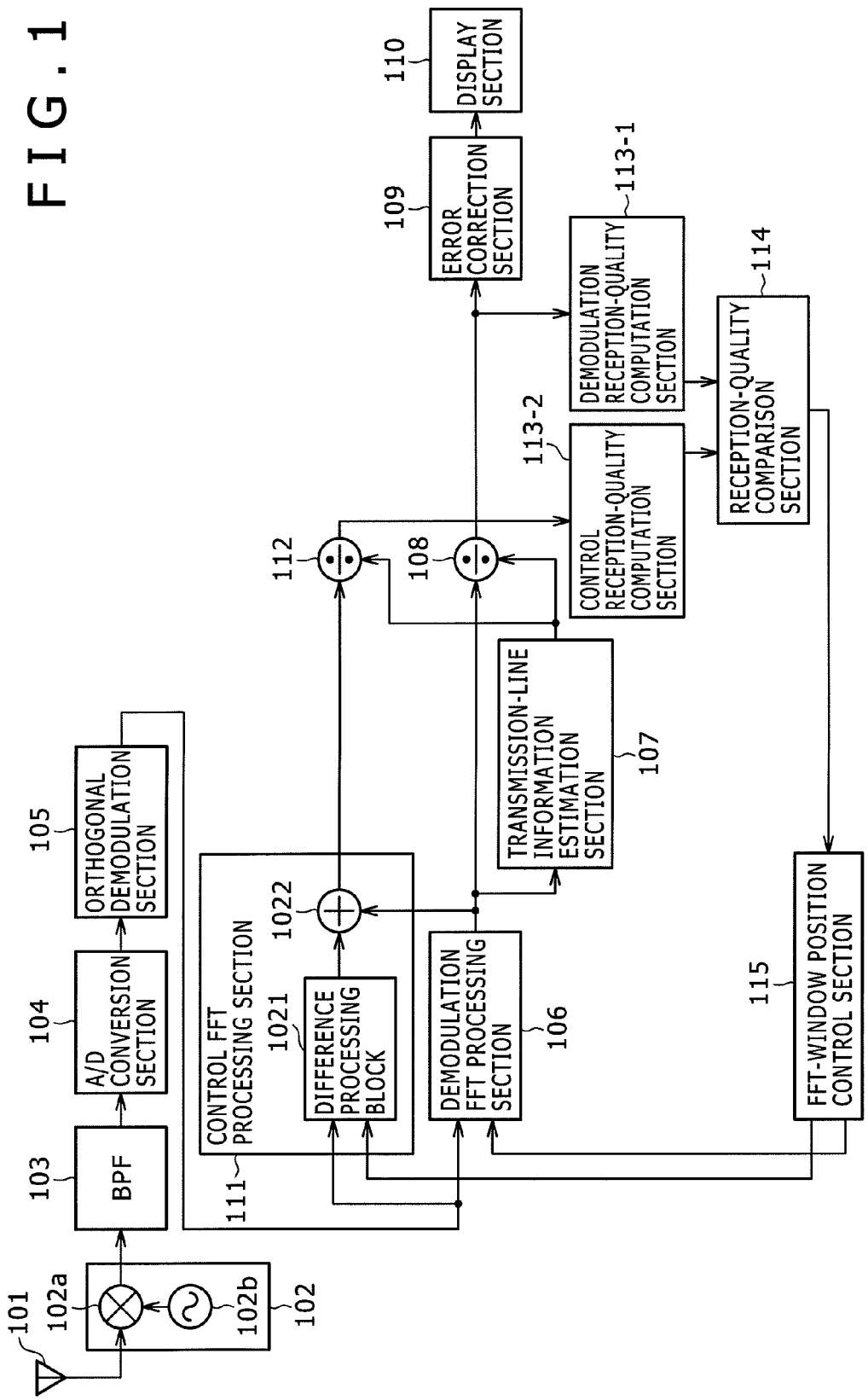
FIG. 1 is a block diagram showing a typical configuration of an OFDM receiving apparatus which serves as an embodiment implementing an information processing apparatus provided by the present invention.

Outline of a Technique Provided by the Invention

First of all, in order to make the explanation of the present invention easy to understand, an outline of an FFT-window setting technique to which the present invention is applied is explained. In the following description, the FFT-window setting technique to which the present invention is applied is referred to as an FFT-window setting technique of the present invention.

In accordance with the FFT-window setting technique of the present invention, the position of the next demodulation FFT window is set on the basis of the result of a demodulation FFT process carried out on a demodulation-related signal extracted by making use of a demodulation FFT window and the result of an FFT process carried out on a control-related signal extracted by making use of another FFT window which is different from the demodulation FFT window. In the following description, the other FFT window different from the demodulation FFT window is referred to as a control FFT window whereas the FFT process carried out on the control-related signal is also referred to as a control FFT process.

In the FFT-window setting technique of the present invention, the number of FFT circuits each used for carrying out an FFT process on a demodulation-related signal extracted by making use of a demodulation FFT window is one.

That is to say, in accordance with the FFT-window setting technique of the present invention, the control FFT process for a control-related signal extracted by making use of a control FFT window is carried out as follows. First of all, for every specific signal inside an interval of a demodulation FFT window but outside the interval of a control FFT window, the following data has been stored in a memory. The data already stored in the memory is a difference in data between the specific signal and another signal, which is outside the interval of a demodulation FFT window but inside the interval of a control FFT window and is separated away from the specific signal by a valid-symbol length. Then, the difference in data is subjected to a DFT (Discrete Fourier Transform) process in order to generate a frequency-domain signal. Subsequently, a signal resulting from a demodulation FFT process carried out on a demodulation-related signal extracted from a received OFDM signal by making use of a demodulation FFT window as a signal having the same frequency as the signal obtained as a result of the DFT process is added to the signal obtained as a result of the DFT process in order to carry out a control FFT process on a control-related signal extracted by making use of a control FFT window.

Thus, without providing a plurality of FFT circuits each having a large circuit scale, it is possible to obtain results of FFT processes which are each carried out on a signal extracted by making use of one of a plurality of FFT windows. In addition, a control FFT process carried out on a control-related signal extracted from a received OFDM signal by making use of a control FFT window does not have an effect on the demodulation data. Thus, the reception characteristic does not deteriorate.

Embodiments of the Invention

Typical Configuration of the Information Processing Apparatus According to First Embodiment FIG. 1 is a block diagram showing a typical configuration of an OFDM receiving apparatus which serves as an embodiment implementing an information processing apparatus provided by the present invention.

As shown in the figure, the OFDM receiving apparatus employs an antenna 101, a tuner 102, a BPF (Band Pass Filter) 103, an A/D conversion section 104, an orthogonal demodulation section 105, a demodulation FFT processing section 106, a transmission-line information estimation section 107, a demodulation equalization section 108, an error correction section 109 and a display section 110.

The OFDM receiving apparatus also employs a control FFT processing section 111, a control equalization section 112, a demodulation reception-quality computation section 113-1 and a control reception-quality computation section 113-2, a reception-quality comparison section 114 and an FFT-window position control section 115, to which an FFT-window setting method provided by the present embodiment is to be applied. The control FFT processing section 111 is configured to employ a difference processing block 1021 and an addition block 1022.

Typical Operations of the Information Processing Apparatus According to the First Embodiment Operations carried out by the OFDM receiving apparatus are explained as follows.

The antenna 101 receives a broadcast wave broadcasted by a broadcasting station and supplies the broadcast wave to the tuner 102 as an RF (Radio Frequency) signal.

The tuner 102 employs a multiplication block 102a and a local oscillation block 102b. The tuner 102 converts the RF signal received from the antenna 101 into an IF (Intermediate Frequency) signal in a frequency conversion process.

The tuner 102 supplies the IF signal to the BPF 103 for filtering the signal. The BPF 103 supplies the filtered IF signal to the A/D conversion section 104 for converting the IF signal from an analog signal into a digital signal which is then supplied to the orthogonal demodulation section 105.

By making use of a carrier signal having a carrier frequency determined in advance, the orthogonal demodulation section 105 carries out an orthogonal demodulation process on the digital IF signal received from the A/D conversion section 104 in order to generate a baseband OFDM signal as the output signal of the orthogonal demodulation section 150.

The baseband OFDM signal generated by the orthogonal demodulation section 105 is the so-called OFDM time-domain signal which is a pre-FFT signal to be subjected to an FFT process. The OFDM time-domain signal is a complex signal which is obtained as a result of the orthogonal demodulation process carried out by the orthogonal demodulation section 105. The OFDM time-domain signal includes a real-axis component referred to as an I-channel signal and an imaginary-axis component referred to as a Q-channel signal. The orthogonal demodulation section 105 supplies the OFDM time-domain signal to the demodulation FFT processing section 106 and the control FFT processing section 111.

The demodulation FFT processing section 106 inputs a demodulation FFT window set by the FFT-window position control section 115. The demodulation FFT processing section 106 carries out a demodulation FFT process on a signal which has been extracted from the OFDM time-domain signal by making use of the demodulation FFT window. As a result of the demodulation FFT process, data transmitted for every sub-carrier is extracted and output by the demodulation FFT processing section 106. The signal output by the demodulation FFT processing section 106 is the so-called frequency-domain signal which is a signal obtained as a result of the demodulation FFT process. That is to say, in the following description, the signal obtained as a result of the FFT process is referred to as an OFDM frequency-domain signal. In order to clearly distinguish the OFDM frequency-domain signal output by the demodulation FFT processing section 106 from the OFDM frequency-domain signal output by the control FFT processing section 111, in the following description, the OFDM frequency-domain signal output by the demodulation FFT processing section 106 is referred to as demodulation data.

The demodulation FFT processing section 106 supplies the demodulation data to the control FFT processing section 111 and the demodulation equalization section 108. In addition, the demodulation FFT processing section 106 supplies all SP (Scattered Pilot) signals of the demodulation data to the transmission-line information estimation section 107.

The transmission-line information estimation section 107 carries out an interpolation process for the time and frequency directions by making use of the SP signals in order to estimate transmission-line information. The transmission-line information estimation section 107 supplies the transmission-line information to the demodulation equalization section 108 and the control equalization section 112.

By making use of transmission-line information received from the transmission-line information estimation section 107, the demodulation equalization section 108 carries an equalization process on the demodulation data received from the demodulation FFT processing section 106. The demodulation equalization section 108 supplies demodulated data obtained as a result of the equalization process to the error correction section 109.

The error correction section 109 carries out a de-interleave process on the demodulated data received from the demodulation equalization section 108 as a counterpart process of an interleave process carried out by the transmitting apparatus transmitting the broadcast wave to the OFDM receiving apparatus. After the demodulated data completes a depuncture process, a Vitervi decoding process, a diffusion-signal elimination process and an RS decoding process, the data is output by the error correction section 109 to the display section 110 as final demodulated data.

The display section 110 displays a video based on the final demodulated data which has been received from the error correction section 109.

The sequence of the processes described above is referred to as OFDM demodulation processing.

Next, the following description explains a typical processing sequence ending with a process to set a demodulation FFT window used in a demodulation FFT process which is carried out as a part of the OFDM demodulation processing. It is to be noted that, in the following description, the processing sequence is referred to as an FFT-window setting process. This FFT-window setting process described below is a typical process to which an FFT-window setting method provided by the present embodiment is applied.

As described above, the demodulation FFT processing section 106 receives an OFDM time-domain signal from the orthogonal demodulation section 105 and a demodulation FFT window from the FFT-window position control section 115. Then, the demodulation FFT processing section 106 carries out a demodulation FFT process on a demodulation-related signal which has been extracted from the OFDM time-domain signal by making use the demodulation FFT window, and generates demodulation data as a result of the FFT process. The demodulation data obtained as a result of the demodulation FFT process is an OFDM frequency-domain signal which is also fed back to the demodulation FFT processing section 106 by way of the demodulation equalization section 108, the demodulation reception-quality computation section 113-1, the reception-quality comparison section 114 and the FFT-window position control section 115. For this reason, the OFDM frequency-domain signal output by the demodulation FFT processing section 106 as a modulated signal is referred to as demodulation data.

By the same token, the control FFT processing section 111 receives the OFDM time-domain signal from the orthogonal demodulation section 105 and a control FFT window from the FFT-window position control section 115 as well. In addition, the control FFT processing section 111 also receives the demodulation data from the demodulation FFT processing section 106. As described above, the demodulation data is a result of a demodulation FFT process which is carried out by the demodulation FFT processing section 106. On the basis of the OFDM time-domain signal received from the orthogonal demodulation section 105, the control FFT window received from the FFT-window position control section 115 and the demodulation data received from the demodulation FFT processing section 106, the control FFT processing section 111 carries out a process equivalent to an FFT process on a control-related signal which has been extracted from the OFDM time-domain signal by making use the control FFT window. In the following description, the process equivalent to an FFT process is referred to as an FFT equivalent process. The result of the FFT equivalent process is an OFDM frequency-domain signal which serves as the output of the control FFT processing section 111. As will be described later, the OFDM frequency-domain signal output by the control FFT processing section 111 is fed back to the control FFT processing section 111 by way of the control equalization section 112, the control reception-quality computation section 113-2, the reception-quality comparison section 114 and the FFT-window position control section 115 to be used in control of the position of a control FFT window. For this reason, in the following description, the OFDM frequency-domain signal output by the control FFT processing section 111 is referred to as control data.

Typical details of the FFT equivalent process carried out by the control FFT processing section 111 are explained as follows.

Let the time of the start of a demodulation FFT window be 0 and the interval of each of the demodulation FFT window and the control FFT window be N time units. In this case, Eq. (1) given below expresses the demodulation data $Y^0(\omega)$ obtained for a frequency $\omega$ as a result of an FFT process carried out on a signal which is extracted from an OFDM time-domain signal by making use of the demodulation FFT window having an interval of N time units.

$$Y^0(\omega) = \sum_{k=0}^{N-1} r(k)e^{-j2\pi\frac{k\omega}{N}} \quad (1)$$

In Eq. (1) given above, notation r(k) denotes the OFDM time-domain signal at a time k whereas notation j denotes the imaginary unit.

Let us consider a case in which the time of the start of the demodulation FFT window is earlier by s time units than the time of the start of the control FFT window. In this case, the OFDM time-domain signals within the control FFT window are r(s), r(s+1), ... and r(N−1+s) whereas Eq. (2) given below expresses the control data $Y^s(\omega)$ obtained for a frequency $\omega$ as a result of an FFT process carried out on a signal which is extracted from an OFDM time-domain signal by making use of the control FFT window having an interval of N time units.

$$Y^s(\omega) = \sum_{k=s}^{N-1+s} r(k)e^{-j2\pi\frac{k\omega}{N}} \qquad (2)$$

$$= \sum_{k=0}^{N-1} r(k)e^{-j2\pi\frac{k\omega}{N}} + \sum_{k=N}^{N-1+s} r(k)e^{-j2\pi\frac{k\omega}{N}} -$$

$$\sum_{k=0}^{s-1} r(k)e^{-j2\pi\frac{k\omega}{N}}$$

$$= Y^0(\omega) + \sum_{k=0}^{s-1} \{r(k+N) - r(k)\}e^{-j2\pi\frac{k\omega}{N}}$$

Let us consider a case in which the time of the start of the control FFT window is earlier by s time units than the time of the start of the demodulation FFT window. In this case, the OFDM time-domain signals within the control FFT window are r(−s), r(−s+1), ... r(−1), r(0), r(1), ... and r(N−1−s) whereas Eq. (3) given below expresses the control data $Y^{-s}(\omega)$ obtained for a frequency $\omega$ as a result of an FFT process carried out on a signal which is extracted from an OFDM time-domain signal by making use of the control FFT window having an interval of N time units.

$$Y^{-s}(\omega) = \sum_{k=-s}^{N-1-s} r(k)e^{-j2\pi\frac{k\omega}{N}} \qquad (3)$$

$$= Y^0(\omega) + \sum_{k=N-s}^{N-1} \{r(k-N) - r(k)\}e^{-j2\pi\frac{k\omega}{N}}$$

The first term of the expression on the right-hand side of each of Eqs. (2) and (3) is a term representing a result of an FFT process carried out on a signal which is extracted from an OFDM time-domain signal by making use of the demodulation FFT window. That is to say, the first term of the expression on the right-hand side of each of Eqs. (2) and (3) is a term representing the value of the demodulation data expressed by Eq. (1) as a frequency-domain signal generated by the demodulation FFT processing section 106. In other words, the first term of the expression on the right-hand side of each of Eqs. (2) and (3) is a term which does not need to be computed by the control FFT processing section 111.

On the other hand, the second term of the expression on the right-hand side of each of Eqs. (2) and (3) is a term which can be computed by carrying out a DFT process on the OFDM time-domain signal in a period of s time units. In order to compute the second term of the expression on the right-hand side of each of Eqs. (2) and (3), the control FFT processing section 111 is provided with a difference processing block 1021.

To put it in detail, the difference processing block 1021 outputs the second term of the expression on the right-hand side of Eq. (2) or (3) to an addition block 1022 which also receives the first term of the expression on the right-hand side of Eq. (2) or (3) from the demodulation FFT processing section 106. The addition block 1022 then adds the second term of the expression on the right-hand side of Eq. (2) or (3) to the first term of the expression on the right-hand side of Eq. (2) or (3) respectively. A sum obtained as a result of the addition operation is expressed by Eq. (2) or (3) as the sum of the second term of the expression on the right-hand side of Eq. (2) or (3) and the first term of the expression on the right-hand side of Eq. (2) or (3). Typical Configuration of the Control FFT Section and Typical Operations Carried Out by the Control FFT Section The following description explains a typical configuration of the difference processing block 1021 and typical operations carried out by the difference processing block 1021.

Figure 2:
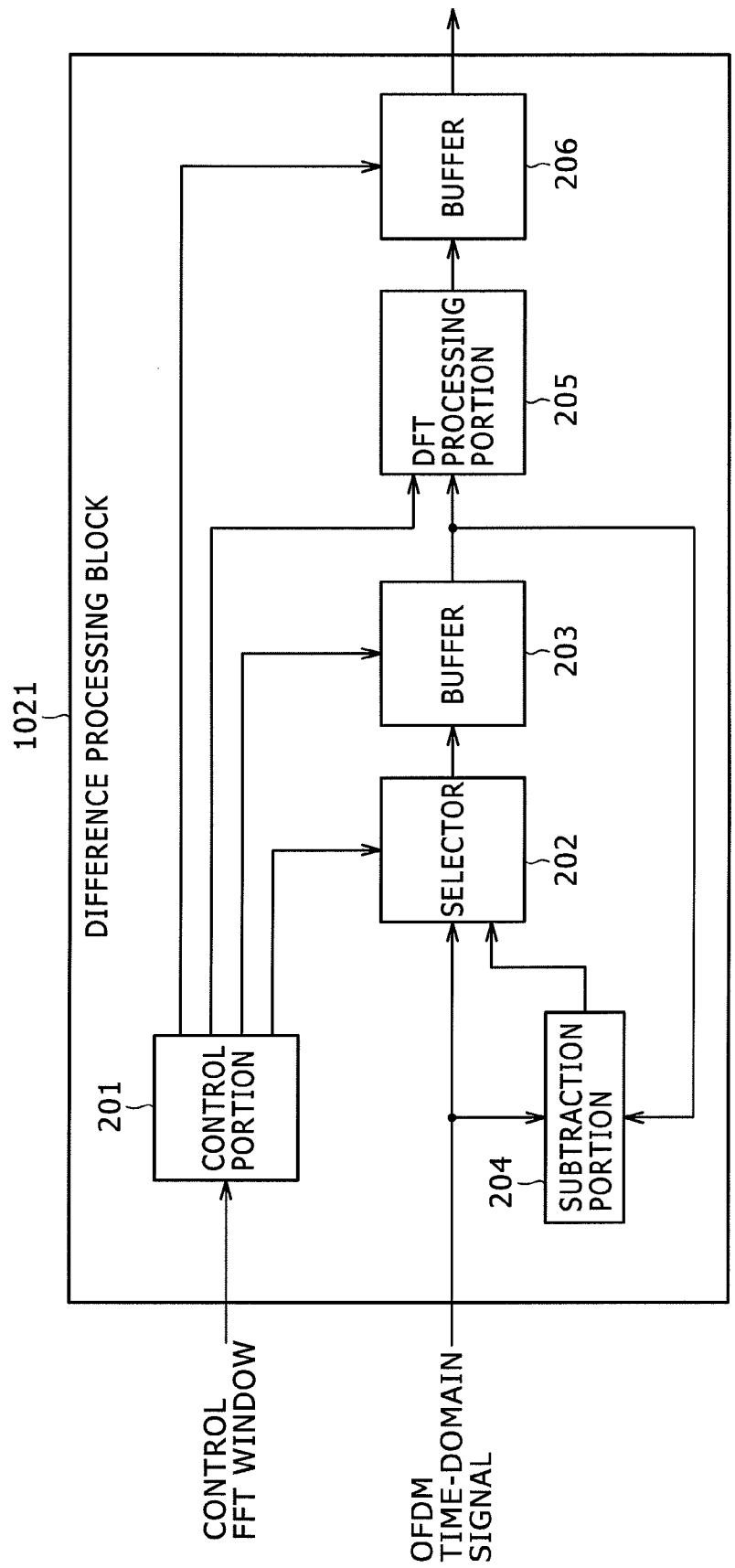
FIG. 2 is a block diagram showing a typical configuration of a difference processing block included in a control FFT processing section employed in the OFDM receiving apparatus shown in the block diagram of FIG. 1.

FIG. 2 is a block diagram showing a typical configuration of the difference processing block 1021.

As shown in the figure, the difference processing block 1021 is configured to employ a control portion 201, a selector 202, a first buffer 203, a subtraction portion 204, a DFT processing portion 205 and a second buffer 206.

The difference processing block 1021 having such a configuration carries out the following typical operations.

The control portion 201 is a portion for generating a variety of control signals by making use of a control FFT window received from the FFT-window position control section 115.

Here, let the time of the start of the demodulation FFT window be 0 and notation s denote a positive integer. In addition, let us consider a case in which the time of the start of the control FFT window is a time s or the time of the start of the control FFT window is later by s time units than the time of the start of the demodulation FFT window. In this case, the control FFT processing section 111 computes the control data $Y^s(\omega)$ in accordance with Eq. (2). That is to say, the difference processing block 1021 computes the second term of the expression on the right-hand side of Eq. (2).

Figure 3:
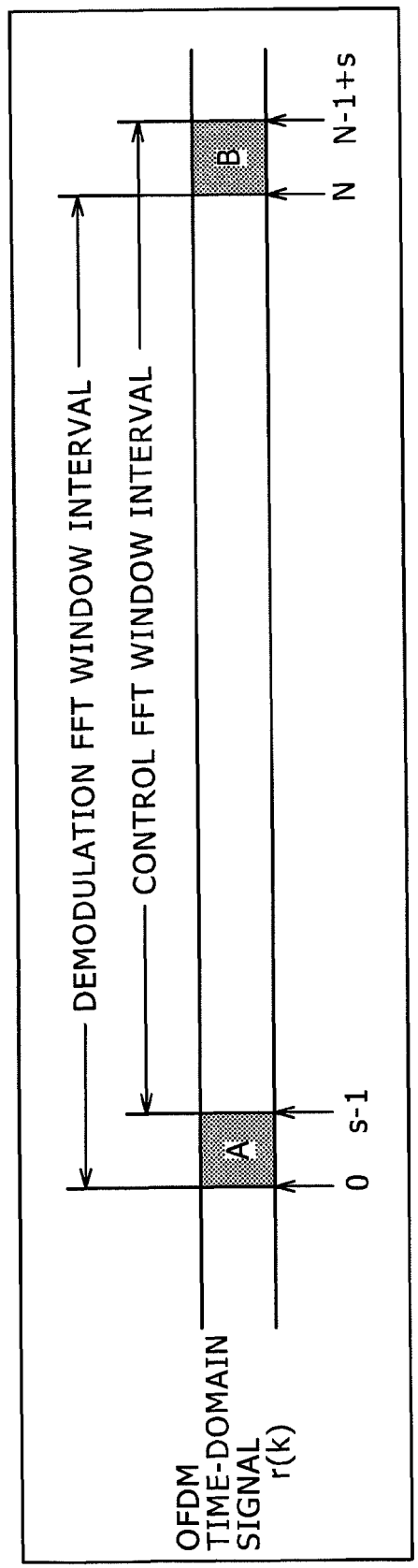
FIG. 3 is an exemplary diagram showing a relation between the interval of a control FFT window and the interval of a demodulation FFT window.

FIG. 3 is a diagram showing a relation between the interval of the control FFT window and the interval of the demodulation FFT window for the case in which the time of the start of the control FFT window is later by s time units than the time of the start of the demodulation FFT window.

During a sub-interval A shown in the diagram of FIG. 3, OFDM time-domain signals r(k) where k=0, 1, ... and (s−1) are received. At that time, the selector 202 selects the OFDM time-domain signal r(k) as an input and stores the OFDM time-domain signal r(k) in the first buffer 203. The selector 202 selects the OFDM time-domain signal r(k) in accordance with a select signal received from the control portion 201.

As will be described below, during a sub-interval B shown in the diagram of FIG. 3, OFDM time-domain signals r(k+N) where k=0, 1, ... and (s−1) are received. During a period between the sub-intervals A and B, the selector 202 is in a state of being unable to generate an output.

In the sub-interval B during which the OFDM time-domain signals r(k+N) where k=0, 1, ... and (s−1) are received, the subtraction portion 204 receives the OFDM time-domain signal r(k+N) and the OFDM time-domain signal r(k) from the first buffer 203, subtracting the OFDM time-domain signal r(k) from the OFDM time-domain signal r(k+N) to give a difference signal (r(k+N)−r(k)). In this case, the selector 202 selects the difference signal (r(k+N)−r(k)) as an input and stores the difference signal (r(k+N)−r(k)) in the first buffer 203. The selector 202 selects the difference signal (r(k+N)−r(k)) in accordance with a select signal received from the control portion 201.

The first buffer 203 receives the difference signals (r(K+N)−r(k)) where k=0, 1, ... and (s−1) from the selector 202 and stores the difference signals (r(K+N)−r(k)) at the addresses of locations used so far for storing the OFDM time-domain signals r(k).

At a stage at which all the difference signals (r(k+N)−r(k)) have been stored in the first buffer 203, the control portion 201 supplies a processing start signal and a rotation angle to the DFT processing portion 205. The rotation angle is an angle represented by an expression $2\pi k\omega/N$, where k=0, 1, . . . and (s−1), in Eq. (2).

Then, the DFT processing portion 205 computes the value of the second term of the expression on the right-hand side of Eq. (2) by making use of the rotation angle received from the control portion 201 and the difference signal (r(K+N)−r(k)) received from the first buffer 203. The computation result output by the DFT processing portion 205 as the value of the second term of the expression on the right-hand side of Eq. (2) is stored temporarily in the second buffer 206.

The sequence of processes described above is carried out for a desired frequency $\omega$ in accordance with control executed by the control portion 201.

As described above, if the time of the start of the control FFT window is s, meaning that the time of the start of the control FFT window is later by s time units than the time of the start of the demodulation FFT window, the difference processing block 1021 computes the value of the second term of the expression on the right-hand side of Eq. (2).

On the other hand, let us consider a case in which the time of the start of the control FFT window is −s, meaning that the time of the start of the control FFT window is earlier by s time units than the time of the start of the demodulation FFT window. In this case, the control FFT processing section 111 computes the control data $Y^{-s}(\omega)$ in accordance with Eq. (3). That is to say, the difference processing block 1021 computes the second term of the expression on the right-hand side of Eq. (3).

Figure 4:
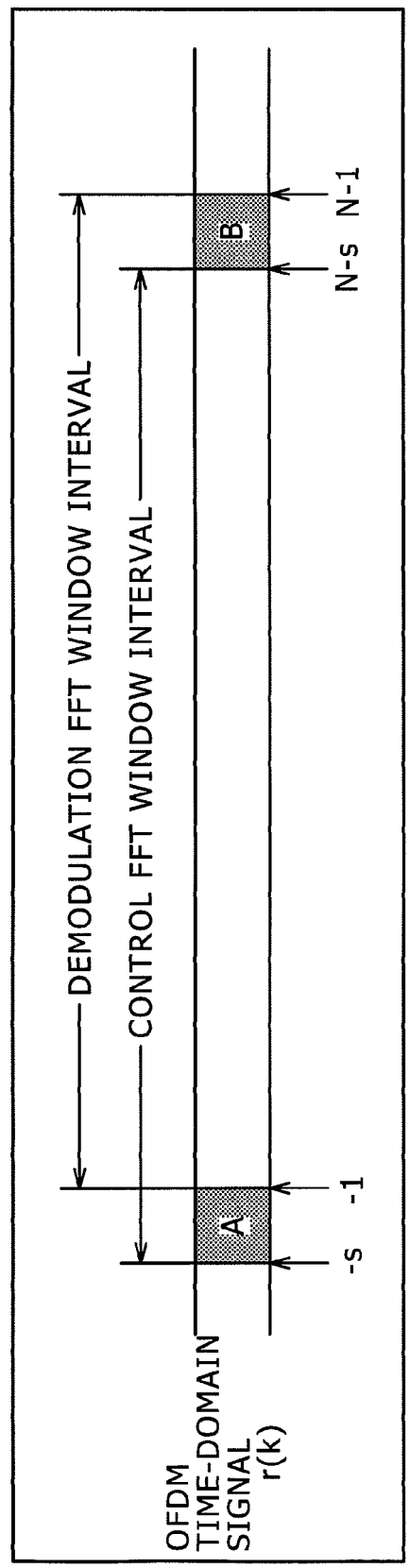
FIG. 4 is another exemplary diagram showing a relation between the interval of a control FFT window and the interval of a demodulation FFT window.

FIG. 4 is a diagram showing a relation between the interval of the control FFT window and the interval of the demodulation FFT window for the case in which the time of the start of the control FFT window is earlier by s time units than the time of the start of the demodulation FFT window.

By comparing the diagrams of FIGS. 3 and 4 with each other, it is easily understood that, in operations carried out by the difference processing block 1021 for the case shown in the diagram of FIG. 4, a process carried out by the subtraction portion 204 and the rotation angle used by the DFT processing portion 205 are different from those of the operations carried out by the difference processing block 1021 for the case shown in the diagram of FIG. 3. For this reason, only these differences are explained as follows.

The subtraction portion 204 computes difference signals (r(k−N)−r(k)) where k=(N−s), (N−s+1) . . . and (N−1). In addition, the rotation angle used by the DFT processing portion 205 is an angle represented by the expression $2\pi k\omega/N$ where k=(N−s), (N−s+1) . . . and (N−1).

When the DFT processing portion 205 completes the processing to compute the value of the second term of the expression on the right-hand side of Eq. (2) or (3) by making use of the rotation angle received from the control portion 201 and the difference signal (r(K+N)−r(k)) received from the first buffer 203 for all frequencies $\omega$ and each value of the second term of the expression has been stored in the second buffer 206 as described above, the addition block 1022 carries out a process based on Eq. (2) or (3) for every frequency $\omega$. That is to say, the addition block 1022 adds the first term of the expression on the right-hand side of Eq. (2) or (3) to the second term of the expression on the right-hand side of Eq. (2) or (3) respectively. As explained earlier, the first term of the expression on the right-hand side of Eq. (2) or (3) is the demodulation data computed by the demodulation FFT processing section 106 whereas the second term of the expression on the right-hand side of Eq. (2) or (3) is an OFDM frequency-domain signal obtained as a result of the DFT process carried out by the DFT processing portion 205 and stored in the second buffer 206.

In the process described above, the addition block 1022 reads out the second term computed for a frequency $\omega$ from the second buffer 206 with a timing which coincides with the timing to supply the first term computed for the same frequency $\omega$ from the demodulation FFT processing section 106 to the addition block 1022 in accordance with control executed by the control portion 201.

By configuring the control FFT processing section 111 as described above, an FFT equivalent process can be carried out without providing FFT circuits excessively.

The reader is requested to refer back to the block diagram of FIG. 1. The following description continues the explanation of the FFT-window setting process carried out as a typical process to which the FFT-window setting method provided by the present embodiment is applied.

As described above, the transmission-line information estimation section 107 inputs all the SP signals of the demodulation data generated by the demodulation FFT processing section 106 and carries out an interpolation process in the time and frequency directions on the SP signals in order to estimate transmission-line information. On the basis of the transmission-line information received from the transmission-line information estimation section 107, the demodulation equalization section 108 carries out an equalization process on the demodulation data.

By the same token, by making use of the transmission-line information received from the transmission-line information estimation section 107, the control equalization section 112 carries out an equalization process on the control data received from the control FFT processing section 111.

All or a portion of the demodulation data completing the equalization process carried out by the demodulation equalization section 108 is supplied to the demodulation reception-quality computation section 113-1. The demodulation reception-quality computation section 113-1 computes the reception quality of the demodulation data generated for the demodulation FFT window and supplies the reception quality obtained as a result of the computation to the reception-quality comparison section 114.

By the same token, all or a portion of the control data completing the equalization process carried out by the control equalization section 112 is supplied to the control reception-quality computation section 113-2. The control reception-quality computation section 113-2 computes the reception quality of the control data generated for the control FFT window and supplies the reception quality obtained as a result of the computation to the reception-quality comparison section 114.

A computation method adopted by the demodulation reception-quality computation section 113-1 to serve as a method for computing the reception quality of the demodulation data is the same as a computation method adopted by the control reception-quality computation section 113-2 to serve as a method for computing the reception quality of the control data. For this reason, the demodulation reception-quality computation section 113-1 has functions and a configuration which are identical with those of the control reception-quality computation section 113-2. In the following description, the demodulation reception-quality computation section 113-1 and the control reception-quality computation section 113-2 are both referred to as a reception-quality computation section denoted by generic reference numeral 113 in case there is no need to distinguish the demodulation reception-quality computation section 113-1 and the control reception-quality computation section 113-2 from each other.

Figure 5:
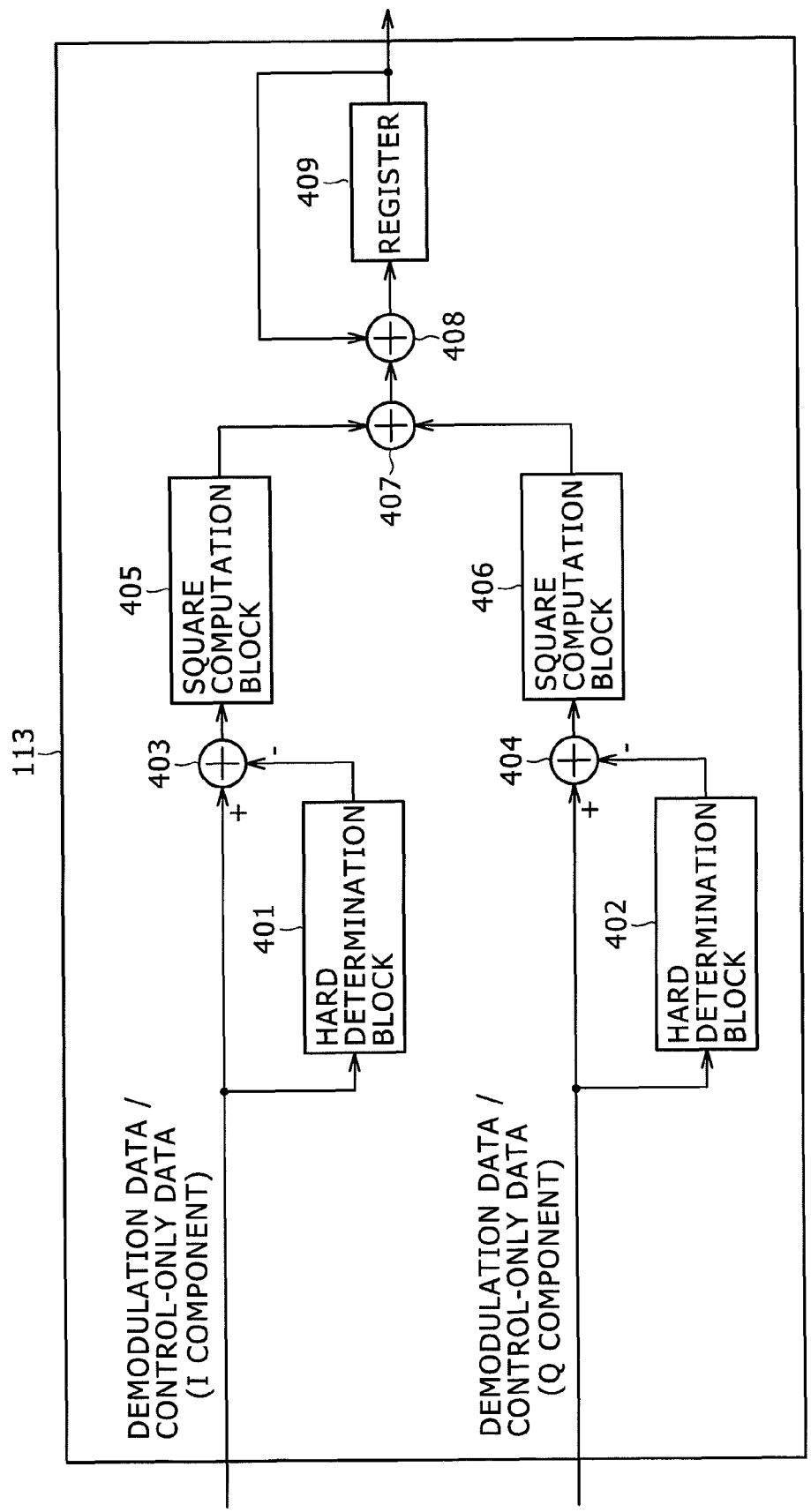
FIG. 5 is a block diagram showing a typical detailed configuration of a reception-quality computation section employed in the OFDM receiving apparatus shown in the block diagram of FIG. 1.

FIG. 5 is a block diagram showing a typical configuration of the reception-quality computation section 113.

As shown in the figure, the reception-quality computation section 113 employs a I hard determination block 401, a Q hard determination block 402, an I subtraction block 403, a Q subtraction block 404, an I square computation block 405, a Q square computation block 406, a first addition block 407, a second addition block 408 and a register 409.

The reception-quality computation section 113 having such a configuration carries out the following operations in order to compute a reception quality. That is to say, a concrete reception-quality computation method for computing a reception quality is a method described as follows.

The I and Q components of input complex data (demodulation data or control data) are supplied to the I hard determination block 401 and the Q hard determination block 402 respectively. Each of the I hard determination block 401 and the Q hard determination block 402 carries out a hard determination process in accordance with the modulation method.

The I subtraction block 403 is a portion for subtracting the output of the I hard determination block 401 from the I component of the input complex data in order to compute the difference between the output of the I hard determination block 401 and the I component of the input complex data. The I subtraction block 403 outputs the difference to the I square computation block 405. The I square computation block 405 is a block for computing the square of the difference and outputting the square to the first addition block 407.

By the same token, the Q subtraction block 404 is a portion for subtracting the output of the Q hard determination block 402 from the Q component of the input complex data in order to compute the difference between the output of the Q hard determination block 402 and the Q component of the input complex data. The Q subtraction block 404 outputs the difference to the Q square computation block 406. The Q square computation block 406 is a block for computing the square of the difference and outputting the square to the first addition block 407.

The first addition block 407 is a block for adding the output of the I square computation block 405 to the output of the Q square computation block 406. The second addition block 408 and the register 409 are blocks for integrating the output of the first addition block 407 over a time period corresponding to some portions determined in advance as portions of the input complex data.

An output generated by the register 409 as an output obtained as a result of the integration of the output of the first addition block 407 over a time period corresponding to some portions determined in advance as portions of the input complex data is the so-called reception quality.

The reader is requested to refer back to the block diagram of FIG. 1. The reception-quality comparison section 114 is a section for comparing the demodulation reception quality generated by the demodulation reception-quality computation section 113-1 to serve as the reception quality of the demodulation data with the control reception quality generated by the control reception-quality computation section 113-2 to serve as the reception quality of the control data. That is to say, the reception-quality comparison section 114 is a section for comparing the reception quality for the demodulation FFT window with the reception quality for the control FFT window. The reception-quality comparison section 114 supplies the result of the comparison to the FFT-window position control section 115.

If the comparison result generated by the reception-quality comparison section 114 indicates that the reception quality for the control FFT window is better than the reception quality for the demodulation FFT window, the FFT-window position control section 115 makes use of the present control FFT window as the next demodulation FFT window. If the comparison result generated by the reception-quality comparison section 114 indicates that the reception quality for the demodulation FFT window is better than the reception quality for the control FFT window, on the other hand, the FFT-window position control section 115 makes use of the present demodulation FFT window as the next demodulation FFT window. The FFT-window position control section 115 supplies the next demodulation FFT window determined in this way to the demodulation FFT processing section 106.

If the comparison result generated by the reception-quality comparison section 114 indicates that the reception quality for the control FFT window is better than the reception quality for the demodulation FFT window, the FFT-window position control section 115 makes use of a control-FFT-window position shifted from the present control FFT window in the same direction as the shifting direction adopted right before as the position of the next control FFT window. This is because, by making use of a control-FFT-window position shifted in the shifting direction adopted right before as the position of the present control FFT window, the reception quality for the present control FFT window has been improved as indicated by the comparison result generated by the reception-quality comparison section 114. That is to say, the shifting direction adopted right before is a correct shifting direction. Thus, by making use of a control-FFT-window position shifted from the present control FFT window in the same direction as the shifting direction adopted right before as the position of the next control FFT window, it is expected that the reception quality for the next control FFT window will be further improved.

If the comparison result generated by the reception-quality comparison section 114 indicates that the reception quality for the demodulation FFT window is better than the reception quality for control FFT window, on the other hand, the FFT-window position control section 115 makes use of a control-FFT-window position shifted from the present control FFT window in a direction opposite to the shifting direction adopted right before as the position of the next control FFT window. This is because, by making use of a control-FFT-window position shifted in the shifting direction adopted right before as the position of the present control FFT window, the reception quality for the present control FFT window has not been improved as indicated by the comparison result generated by the reception-quality comparison section 114. That is to say, the shifting direction adopted right before is not a correct shifting direction. Thus, by making use of a control-FFT-window position shifted from the present control FFT window in a direction opposite to the shifting direction adopted right before as the position of the next control FFT window, it is expected that the reception quality for the next control FFT window will be improved as will probably be indicated by a result of evaluation of the reception quality.

It is to be noted that, in the embodiment described above, the demodulation reception-quality computation section 113-1 makes use of all or a part of the demodulation data whereas the control reception-quality computation section 113-2 makes use of all or a part of the control data. In particular, in the case of a BPSK (Binary Phase Shift Keying)

signal, a modulated TMCC (Transmission and Multiplexing Configuration and Control) signal, an AC (Auxiliary Channel) signal, a CP (Continual Pilot) signal or an SP (Scattered Pilot) signal, by making use of all or a part of the demodulation data and the control data which are generated for the signal, the reception quality can be computed with a high degree of precision.

Figure 6:
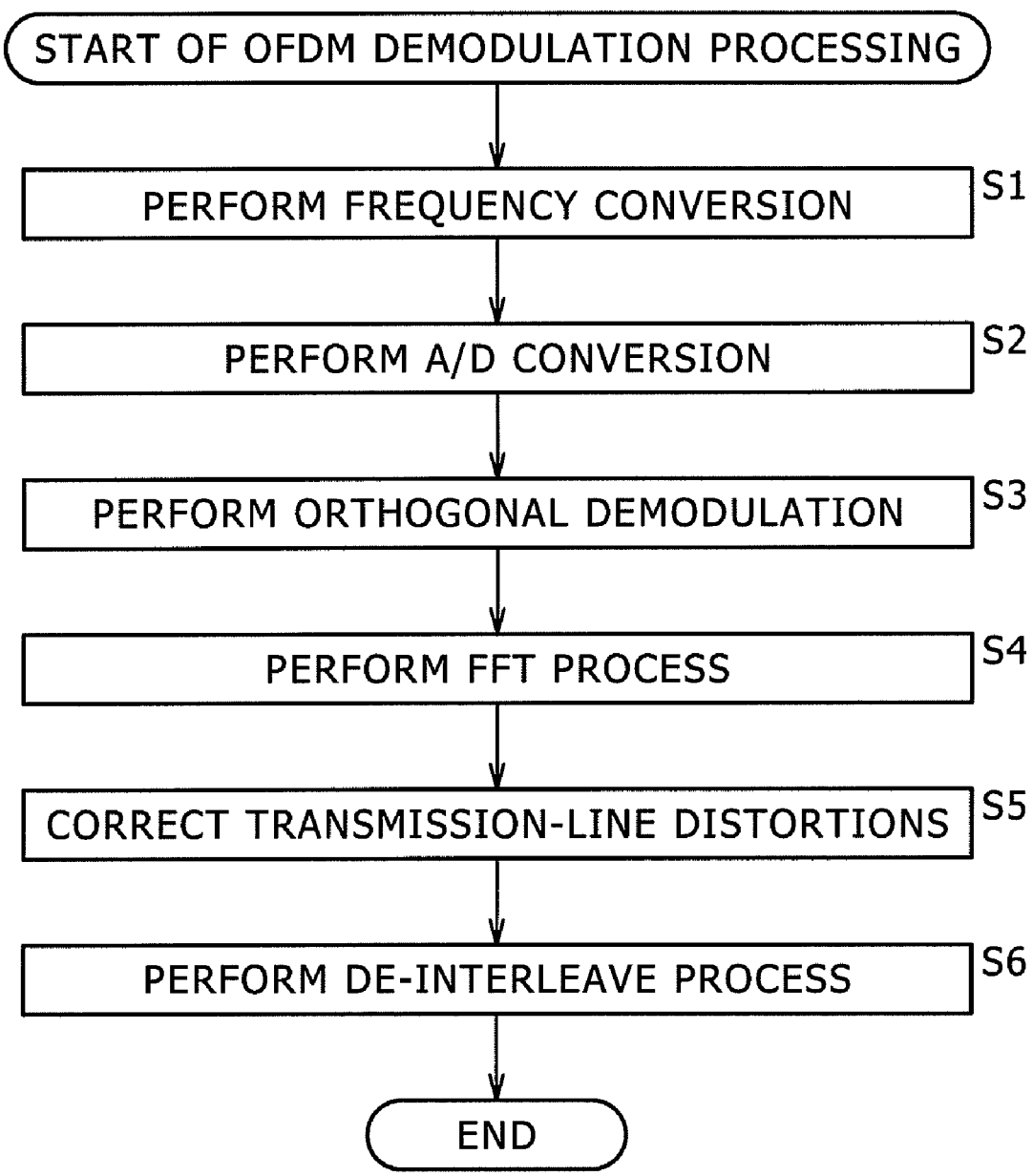
FIG. 6 shows an explanatory flowchart representing the flow of OFDM demodulation processing carried out by the OFDM receiving apparatus shown in the block diagram of FIG. 1.

FIG. 6 shows an explanatory flowchart representing the flow of the OFDM demodulation processing carried out by the OFDM receiving apparatus described so far.

As shown in the figure, the flowchart begins with a step S1 at which the tuner 102 carries out a frequency conversion process of converting an RF signal received by the antenna 101 and supplied by the antenna 101 to the tuner 102 into an IF signal, supplying the IF signal to the A/D conversion section 104 by way of the BPF 103.

Then, at the next step S2, the A/D conversion section 104 carries out an A/D conversion process of converting the analog IF signal into a digital IF signal and supplies the digital IF signal to the orthogonal demodulation section 105.

Subsequently, at the next step S3, the orthogonal demodulation section 105 carries out an orthogonal demodulation process on the digital IF signal received from the A/D conversion section 104 in order to generate an OFDM time-domain signal as a result of the orthogonal demodulation process and supplies the OFDM time-domain signal to the demodulation FFT processing section 106 as well as the control FFT processing section 111.

Then, at the next step S4, the demodulation FFT processing section 106 carries out an FFT process on a demodulation-related signal by making use of a demodulation FFT window. It is to be noted that the demodulation FFT window received by the demodulation FFT processing section 106 is obtained as a result of FFT-window setting processing which is represented by an explanatory flowchart shown in FIG. 7 to be described later.

The result of the FFT process carried out by the demodulation FFT processing section 106 at the step S4 is an OFDM frequency-domain signal which is referred to as demodulation data as described before. The demodulation FFT processing section 106 supplies the demodulation data to the transmission-line information estimation section 107 and the demodulation equalization section 108. Subsequently, at the next step S5, the transmission-line information estimation section 107 and the demodulation equalization section 108 correct transmission-line distortions of the demodulation data in order to generate an equalized signal, supplying the equalized signal to the error correction section 109.

Then, at the next step S6, the error correction section 109 carries out a de-interleave process on the equalized signal, which has completed an interleave process in the transmitter transmitting the RF signal to this OFDM receiving apparatus, in order to generate final demodulated signal. The error correction section 109 supplies the final demodulated signal obtained as a result of the de-interleave process to the display section 110. Subsequently, the display section 110 displays a video based on the final demodulated signal.

Figure 7:
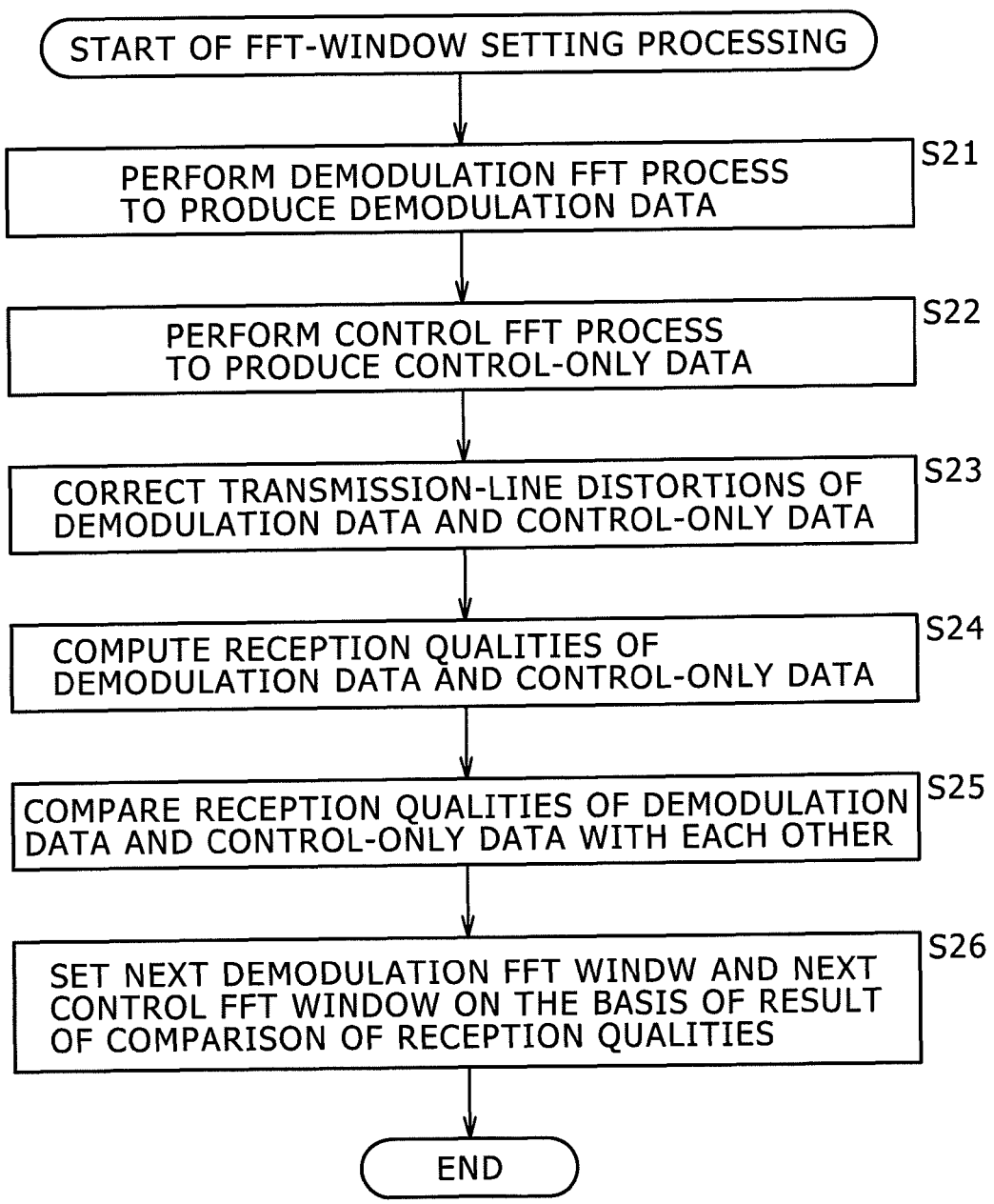
FIG. 7 shows an explanatory flowchart representing FFT-window setting processing carried out by the OFDM receiving apparatus shown in the block diagram of FIG. 1.

FIG. 7 shows the aforementioned explanatory flowchart representing the FFT-window setting processing cited above.

As shown in the figure, the flowchart begins with a step S21 at which the demodulation FFT processing section 106 carries out a demodulation FFT process on a signal, which has been extracted from an OFDM time-domain signal by making use a present demodulation FFT window, in order to generate demodulation data as a result of the demodulation FFT process. It is to be noted that the present demodulation FFT window used in the demodulation FFT process carried out at the step S21 is a next demodulation FFT window which has been set in a process carried out at a step S26 of immediately preceding FFT-window setting processing. The process carried out at a step S26 will be described later.

The demodulation FFT processing section 106 supplies the demodulation data obtained as a result of the demodulation FFT process to the transmission-line information estimation section 107, the demodulation equalization section 108 and the control FFT processing section 111. The control FFT processing section 111 also receives the OFDM time-domain signal from the orthogonal demodulation section 105 and a present control FFT window from the FFT-window position control section 115. It is to be noted that the present control FFT window used in the demodulation FFT process carried out at a step S22 to be described below is a next control FFT window which has been set in the process carried out at the step S26 of immediately preceding FFT-window setting processing.

Then, at the next step S22, the control FFT processing section 111 carries out a control FFT equivalent process on a control-related signal in order to generate control data. The control FFT processing section 111 outputs the control data to the control equalization section 112.

Subsequently, at the next step S23, the transmission-line information estimation section 107 and the demodulation equalization section 108 correct transmission-line distortions of the demodulation data in order to generate an equalized signal related to demodulation. On the other hand, the transmission-line information estimation section 107 and the control equalization section 112 correct transmission-line distortions of the control data in order to generate an equalized signal related to control.

Then, at the next step S24, the demodulation reception-quality computation section 113-1 computes the reception quality of the equalized signal of the demodulation data. By the same token, the control reception-quality computation section 113-2 computes the reception quality of the equalized signal of the control data.

Subsequently, at the next step S25, the reception-quality comparison section 114 compares the reception quality of the demodulation data with the reception quality of the control data.

Then, at the next step S26, the FFT-window position control section 115 sets the next demodulation FFT window and the next control FFT window on the basis of the comparison result. The FFT-window position control section 115 then supplies the next demodulation FFT window to the demodulation FFT processing section 106. The next demodulation FFT window will be used in the process carried out at the step S21 or S4 as the current demodulation FFT window. It is to be noted that the process carried out at the step S21 is the same process carried out at the step S4. On the other hand, the FFT-window position control section 115 supplies the next control FFT window to the control FFT processing section 111. The next control FFT window will be used in the process carried out at the step S22 as the current control FFT window.

As described above, the information processing apparatus provided by the present embodiment is capable of generating FFT results for a plurality of FFT windows without the need to employ a plurality of FFT circuits which each have a large scale. In addition, the result of an FFT process based on a control FFT window is used independently as control data. Thus, the result of an FFT process based on a control FFT window does not have an effect on demodulation data. As a result, the reception quality does not deteriorate anymore.

By the way, the sequence of processes described above can be carried out by making use of hardware or by execution of software.

Figure 8:
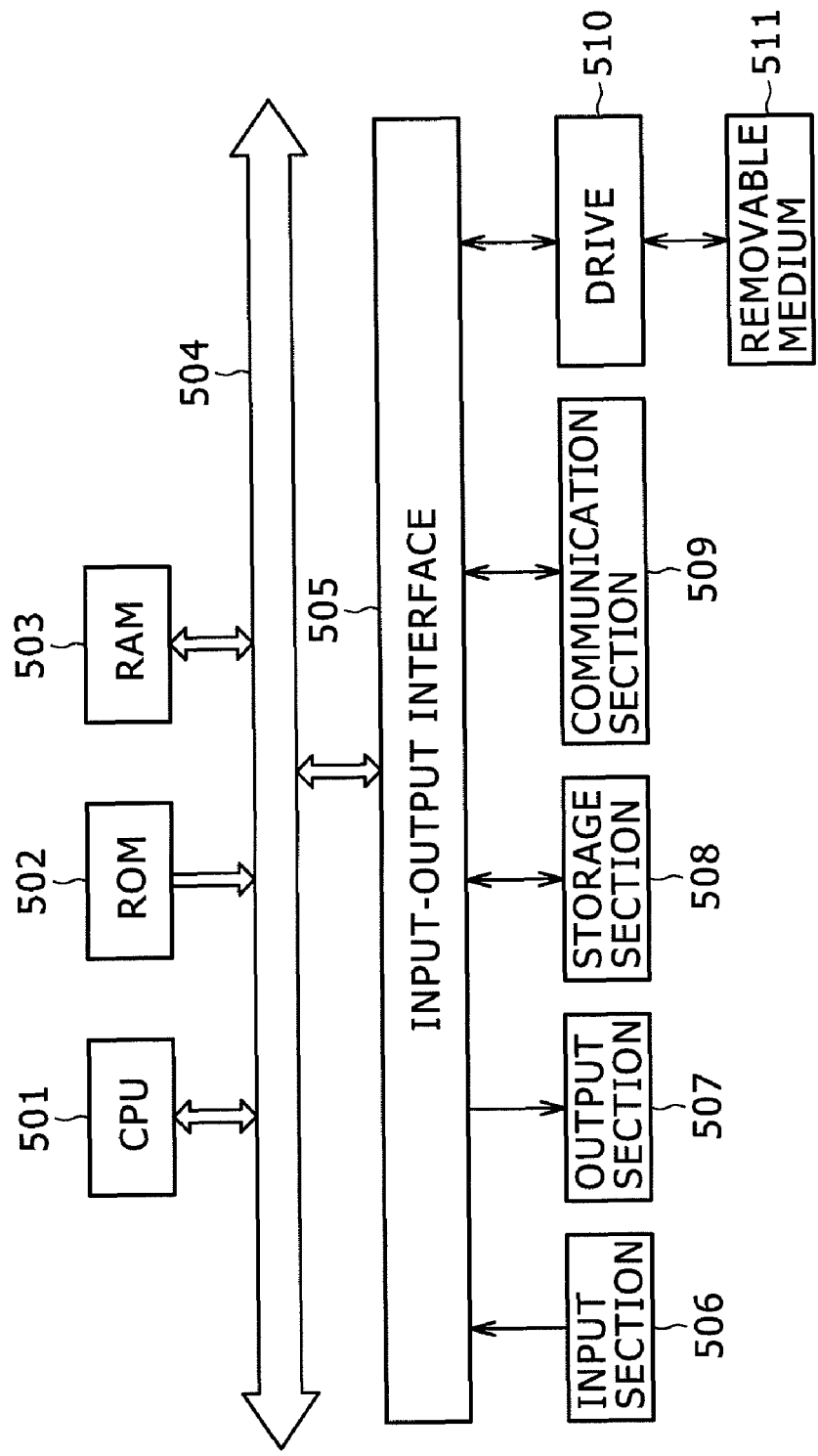
FIG. 8 is a block diagram showing a typical configuration of a computer for executing programs provided by an embodiment of the present invention in the capacity of the OFDM receiving apparatus shown in the block diagram of FIG. 1.

If the sequence of processes described above is carried out by execution of software, at least a portion of the information processing apparatus provided by the present embodiment is typically implemented by a personal computer like one shown in a block diagram of FIG. 8.

In the personal computer with the configuration thereof shown in the block diagram of FIG. 8, a CPU (Central Processing Unit) 501 carries out various kinds of processing by execution of programs which have been stored in advance in a ROM (Read Only Memory) 502 or programs which have been loaded from a storage section 508 into a RAM (Random Access Memory) 503. The RAM 503 is also used for properly storing data which is needed by the CPU 501 in the execution of the processing.

The CPU 501, the ROM 502 and the RAM 503 are connected to each other by a bus 504. The bus 504 is also connected to an input/output interface 505.

The input/output interface 505 is connected to an input section 506, an output section 507, the storage section 508 cited above and a communication section 509. The input section 506 includes a keyboard and a mouse whereas the output section 507 includes a display unit. The storage section 508 includes a hard disk. The communication section 509 has a modem or a terminal adaptor. The communication section 509 is a unit for carrying out communication processing with other apparatus through a network such as the Internet. It is to be noted that the other apparatus and the network are not shown in the block diagram of FIG. 8.

The input/output interface 505 is also connected to a drive 510 when needed on which a removable recording medium 511 is mounted. The removable recording medium 511 can be a magnetic disk, an optical disk, a magneto-optical disk or a semiconductor memory. A computer program is installed from the removable recording medium 511 into the storage section 508 when needed.

If the series of processes explained earlier is carried out by execution of software, programs composing the software can be installed into the personal computer described above from typically the aforementioned network or the removable recording medium 511 mentioned above. In actuality, the personal computer can be a computer embedded in dedicated hardware, a general-purpose personal computer or the like. In this case, the computer or the personal computer serves as the information processing apparatus described above. A general-purpose personal computer is a personal computer, which can be made capable of carrying out a variety of functions by installing a variety of programs into the personal computer.

The aforementioned removable recording medium 511 for recording such programs is a removable recording medium provided to the user separately from the main unit of the information processing apparatus as shown in the block diagram of FIG. 8. Examples of the removable recording mediums 511 also each referred to as a package medium include the magnetic disk such as a floppy disk, the optical disk such as a CD-ROM (Compact Disk-Read Only Memory) or a DVD (Digital Versatile Disk), the magneto-optical disk such as an MD (Mini Disk) as well as the semiconductor memory. Instead of installing the programs from the removable recording mediums 511, the programs can also be stored in advance in an embedded recording medium included in the main unit of the information processing apparatus. Examples of the embedded recording medium are a hard disk included in the storage section 508 and the ROM 502.

It is also worth noting that, in this invention specification, steps of the programs represented by the flowchart described above can be carried out not only in a pre-prescribed order along the time axis, but also concurrently or individually.

In addition, the present invention can be applied to a display apparatus and, thus, the present invention can be applied to the OFDM receiving apparatus which employs the display section 110 as shown in the block diagram of FIG. 1. The display apparatus is employed in a variety of electronic instruments to serve as an apparatus which is capable of displaying an image and/or a video. The image and/or the video are displayed on the basis of a video signal which is supplied to the electronic instrument or generated in the instrument. Examples of the electronic instruments are a digital still camera, a digital video camera, a notebook personal computer, a cellular phone and a TV receiver. The following description briefly explains electronic instruments which each employ such a display apparatus.

For example, the present invention can be applied to a TV receiver which is a typical example of the electronic instruments. The TV receiver employs a video display screen which includes a front panel and a filter glass. The TV receiver is manufactured by making use of the display apparatus provided by the present invention as the video display screen.

As another example, the present invention can be applied to a notebook personal computer which is another typical example of the electronic instruments. The notebook personal computer has a main body including a keyboard which is operated by the user to enter inputs such as characters to the computer. A cover of the main body includes a display section for displaying an image. The notebook personal computer is manufactured by making use of the display apparatus provided by the present invention as the display section.

As a further example, the present invention can be applied to a cellular terminal serving as the aforementioned cellular phone which is a further typical example of the electronic instruments. The cellular terminal has upper and lower cases which are joined to each other by making use of a hinge serving as a link connecting the upper case to the lower case. The cellular terminal can be put in a closed or open state. In addition to the upper case, the lower case and the hinge, the cellular terminal employs a display section, an auxiliary display section, a picture light and a camera. The cellular terminal is manufactured by making use of the display apparatus provided by the present invention as the display section and/or the auxiliary display section.

As a still further example, the present invention can be applied to a digital video camera which is a still further typical example of the electronic instruments. The digital video camera employs a main body, a lens on a side surface, a start/stop switch and a monitor. The lens is oriented in the forward direction. The start/stop switch is operated to start or stop a photographing operation. The digital video camera is manufactured by making use of the display apparatus provided by the present invention as the monitor.

The present application contains subject matter related to that disclosed in Japanese Priority Patent Application JP 2008-253296 filed in the Japan Patent Office on Sep. 30, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An information processing apparatus comprising:

demodulation FFT processing means for carrying out an FFT (Fast Fourier Transform) process on a demodulation-related signal extracted by making use of a demodulation FFT window from every symbol of a received OFDM (Orthogonal Frequency Division Multiplexing) signal in order to convert said extracted demodulation-related signal from a time-domain signal into a frequency-domain signal and for outputting said frequency-domain signal;

control FFT processing means for carrying out a process equivalent to an FFT process on a control-related signal extracted by making use of a control FFT window from every symbol of said received OFDM signal in order to convert said extracted control-related signal from a time-domain signal into a frequency-domain signal and for outputting said frequency-domain signal;

transmission-line information estimation means for generating a transmission-line information estimation value by making use of an SP (Scattered Pilot) signal selected from said frequency-domain signal output by said demodulation FFT processing means;

equalization means for equalizing said frequency-domain signal output by said demodulation FFT processing means and said frequency-domain signal output by said control FFT processing means by making use of said transmission-line information estimation value generated by said transmission-line information estimation means;

reception-quality computation/comparison means for computing a demodulation reception quality by making use of all or a part of said frequency-domain signal generated by said demodulation FFT processing means and equalized by said equalization means and computing a control reception quality by making use of all or a part of said frequency-domain signal generated by said control FFT processing means and equalized by said equalization means and for comparing said computed demodulation reception quality with said computed control reception quality; and FFT-window position control means for controlling said demodulation FFT window to be used by said demodulation FFT processing means and said control FFT window to be used by said control FFT processing means on the basis of a comparison result produced by said reception-quality computation/comparison means.

2. The information processing apparatus according to claim 1 wherein said control FFT processing means includes:

first storage means for storing a data difference between a first signal, which is inside the interval of said demodulation FFT window but outside the interval of said control FFT window, and a second signal, which is outside the interval of said demodulation FFT window but inside the interval of said control FFT window and is separated away from said first signal by a valid-symbol length;

DFT (Discrete Fourier Transform) processing means for carrying out a DFT process on said data difference stored in said first storage means in order to generate a frequency-domain signal as a result of said DFT process; and addition means for adding said frequency-domain signal generated by said DFT processing means to said frequency-domain signal generated by said demodulation FFT processing means as a signal having the same frequency as said frequency-domain signal generated by said DFT processing means in order to generate a sum signal as the output of said control FFT processing means.

3. The information processing apparatus according to claim 2 wherein said control FFT processing means further includes:

subtraction means for computing said data difference between said first and second signals; and selection means for outputting said first signal to said first storage means when said first signal is being received and for outputting said data difference computed by said subtraction means to said first storage means when said second signal is being received.

4. The information processing apparatus according to claim 3 wherein said control FFT processing means further includes a second storage means for storing said frequency-domain signal generated by said DFT processing means till said frequency-domain signal generated by said demodulation FFT processing means as a signal having the same frequency as said frequency-domain signal generated by said DFT processing means is supplied to said addition means.

5. The information processing apparatus according to claim 1 wherein said reception-quality computation/comparison means includes:

first reception-quality computation means for computing the square of a distance between all or a part of said frequency-domain signal generated by said demodulation FFT processing means and equalized by said equalization means and its estimated value;

second reception-quality computation means for computing the square of a distance between all or a part of said frequency-domain signal generated by said control FFT processing means and equalized by said equalization means and its estimated value; and reception-quality comparison means for comparing said square computed by said first reception-quality computation means with said square computed by said second reception-quality computation means.

6. The information processing apparatus according to claim 1 wherein, on the basis of a comparison result produced by said reception-quality computation/comparison means, said FFT-window position control means:

sets said demodulation FFT window currently used by said demodulation FFT processing means or said control FFT window currently used by said control FFT processing means to serve as said demodulation FFT window to be used next by said demodulation FFT processing means; and modifies the direction and quantity of a change to be made to said control FFT window currently used by said control FFT processing means in order to vary said control FFT window currently used by said control FFT processing means and sets said varied control FFT window currently used by said control FFT processing means to serve as said control FFT window to be used next by said control FFT processing means.

7. An information processing method for driving an information processing apparatus, which is used for receiving an OFDM (Orthogonal Frequency Division Multiplexing) signal, to execute:

a demodulation FFT processing step of carrying out an FFT (Fast Fourier Transform) process on a demodulation-related signal extracted by making use of a demodulation FFT window from every symbol of said received OFDM signal in order to convert said extracted demodulation-related signal from a time-domain signal into a frequency-domain signal and outputting said frequency-domain signal;

a control FFT processing step of carrying out a process equivalent to an FFT process on a control-related signal extracted by making use of a control FFT window from every symbol of said received OFDM signal in order to convert said extracted control-related signal from a time-domain signal into a frequency-domain signal and outputting said frequency-domain signal;

a transmission-line information estimation step of generating a transmission-line information estimation value by making use of an SP (Scattered Pilot) signal selected from said frequency-domain signal output at said demodulation FFT processing step;

an equalization step of equalizing said frequency-domain signal output at said demodulation FFT processing step and said frequency-domain signal output at said control FFT processing step by making use of said transmission-line information estimation value generated at said transmission-line information estimation step;

a reception-quality computation/comparison step of computing a demodulation reception quality by making use of all or a part of said frequency-domain signal generated at said demodulation FFT processing step and equalized at said equalization step, computing a control reception quality by making use of all or a part of said frequency-domain signal generated at said control FFT processing step and equalized at said equalization step and comparing said computed demodulation reception quality with said computed control reception quality; and an FFT-window position control step of controlling said demodulation FFT window to be used at said demodulation FFT processing step and said control FFT window to be used at said control FFT processing step on the basis of a comparison result produced at said reception-quality computation/comparison step.

8. An information processing program stored on a non-transitory storage medium for driving a computer, which is used for controlling an OFDM (Orthogonal Frequency Division Multiplexing) receiving apparatus for receiving an OFDM signal, to perform control processing comprising:

a demodulation FFT processing step of carrying out an FFT (Fast Fourier Transform) process on a demodulation-related signal extracted by making use of a demodulation FFT window from every symbol of said received OFDM signal in order to convert said extracted demodulation-related signal from a time-domain signal into a frequency-domain signal and outputting said frequency-domain signal;

a control FFT processing step of carrying out a process equivalent to an FFT process on a control-related signal extracted by making use of a control FFT window from every symbol of said received OFDM signal in order to convert said extracted control-related signal from a time-domain signal into a frequency-domain signal and outputting said frequency-domain signal;

a transmission-line information estimation step of generating a transmission-line information estimation value by making use of an SP (Scattered Pilot) signal selected from said frequency-domain signal output at said demodulation FFT processing step;

an equalization step of equalizing said frequency-domain signal output at said demodulation FFT processing step and said frequency-domain signal output at said control FFT processing step by making use of said transmission-line information estimation value generated at said transmission-line information estimation step;

a reception-quality computation/comparison step of computing a demodulation reception quality by making use of all or a part of said frequency-domain signal generated at said demodulation FFT processing step and equalized at said equalization step, computing a control reception quality by making use of all or a part of said frequency-domain signal generated at said control FFT processing step and equalized at said equalization step and comparing said computed demodulation reception quality with said computed control reception quality; and an FFT-window position control step of controlling said demodulation FFT window to be used at said demodulation FFT processing step and said control FFT window to be used at said control FFT processing step on the basis of a comparison result produced at said reception-quality computation/comparison step.

9. A display apparatus comprising:

demodulation FFT processing means for carrying out an FFT (Fast Fourier Transform) process on a demodulation-related signal extracted by making use of a demodulation FFT window from every symbol of a received OFDM (Orthogonal Frequency Division Multiplexing) signal in order to convert said extracted demodulation-related signal from a time-domain signal into a frequency-domain signal and for outputting said frequency-domain signal;

control FFT processing means for carrying out a process equivalent to an FFT process on a control-related signal extracted by making use of a control FFT window from every symbol of said received OFDM signal in order to convert said extracted control-related signal from a time-domain signal into a frequency-domain signal and for outputting said frequency-domain signal;

transmission-line information estimation means for generating a transmission-line information estimation value by making use of an SP (Scattered Pilot) signal selected from said frequency-domain signal output by said demodulation FFT processing means;

equalization means for equalizing said frequency-domain signal output by said demodulation FFT processing means and said frequency-domain signal output by said control FFT processing means by making use of said transmission-line information estimation value generated by said transmission-line information estimation means;

reception-quality computation/comparison means for computing a demodulation reception quality by making use of all or a part of said frequency-domain signal generated by said demodulation FFT processing means and equalized by said equalization means and computing a control reception quality by making use of all or a part of said frequency-domain signal generated by said control FFT processing means and equalized by said equalization means and for comparing said computed demodulation reception quality with said computed control reception quality;

FFT-window position control means for controlling said demodulation FFT window to be used by said demodulation FFT processing means and said control FFT window to be used by said control FFT processing means on the basis of a comparison result produced by said reception-quality computation/comparison means; and display means for displaying a video based on said frequency-domain signal generated by said demodulation FFT processing means and equalized by said equalization means.

10. An information processing apparatus comprising:
a demodulation FFT processing section configured to carry out an FFT (Fast Fourier Transform) process on a demodulation-related signal extracted by making use of a demodulation FFT window from every symbol of a received OFDM (Orthogonal Frequency Division Multiplexing) signal in order to convert said extracted demodulation-related signal from a time-domain signal into a frequency-domain signal and configured to output said frequency-domain signal;
a control FFT processing section configured to carry out a process equivalent to an FFT process on a control-related signal extracted by making use of a control FFT window from every symbol of said received OFDM signal in order to convert said extracted control-related signal from a time-domain signal into a frequency-domain signal and configured to output said frequency-domain signal;
a transmission-line information estimation section configured to generate a transmission-line information estimation value by making use of an SP (Scattered Pilot) signal selected from said frequency-domain signal output by said demodulation FFT processing section;
an equalization section configured to equalize said frequency-domain signal output by said demodulation FFT processing section and said frequency-domain signal output by said control FFT processing section by making use of said transmission-line information estimation value generated by said transmission-line information estimation section;
a reception-quality computation/comparison section configured to compute a demodulation reception quality by making use of all or a part of said frequency-domain signal generated by said demodulation FFT processing section and equalized by said equalization section and compute a control reception quality by making use of all or a part of said frequency-domain signal generated by said control FFT processing section and equalized by said equalization section and configured to compare said computed demodulation reception quality with said computed control reception quality; and
an FFT-window position control section configured to control said demodulation FFT window to be used by said demodulation FFT processing section and said control FFT window to be used by said control FFT processing section on the basis of a comparison result produced by said reception-quality computation/comparison section.

11. A display apparatus comprising:
a demodulation FFT processing section configured to carry out an FFT (Fast Fourier Transform) process on a demodulation-related signal extracted by making use of a demodulation FFT window from every symbol of a received OFDM (Orthogonal Frequency Division Multiplexing) signal in order to convert said extracted demodulation-related signal from a time-domain signal into a frequency-domain signal and configured to output said frequency-domain signal;
a control FFT processing section configured to carry out a process equivalent to an FFT process on a control-related signal extracted by making use of a control FFT window from every symbol of said received OFDM signal in order to convert said extracted control-related signal from a time-domain signal into a frequency-domain signal and configured to output said frequency-domain signal;
a transmission-line information estimation section configured to generate a transmission-line information estimation value by making use of an SP (Scattered Pilot) signal selected from said frequency-domain signal output by said demodulation FFT processing section;
an equalization section configured to equalize said frequency-domain signal output by said demodulation FFT processing section and said frequency-domain signal output by said control FFT processing section by making use of said transmission-line information estimation value generated by said transmission-line information estimation section;
a reception-quality computation/comparison section configured to compute a demodulation reception quality by making use of all or a part of said frequency-domain signal generated by said demodulation FFT processing section and equalized by said equalization section and compute a control reception quality by making use of all or a part of said frequency-domain signal generated by said control FFT processing section and equalized by said equalization section and configured to compare said computed demodulation reception quality with said computed control reception quality;
an FFT-window position control section configured to control said demodulation FFT window to be used by said demodulation FFT processing section and said control FFT window to be used by said control FFT processing section on the basis of a comparison result produced by said reception-quality computation/comparison section; and
a display section configured to display a video based on said frequency-domain signal generated by said demodulation FFT processing section and equalized by said equalization section.

* * * * *